United States Patent [19]

Murphy

[11] Patent Number: 5,017,257

[45] Date of Patent: May 21, 1991

[54] VARIABLE LENGTH DIE CUTTER AND METHOD OF CUTTING COMPOSITE LABEL

[75] Inventor: William J. Murphy, South Acworth, N.H.

[73] Assignee: Imtec Inc., Bellows Falls, Vt.

[21] Appl. No.: 456,494

[22] Filed: Dec. 26, 1989

[51] Int. Cl.$^5$ .................. B32B 31/00; B26D 5/00; B26D 5/20; B26D 5/28

[52] U.S. Cl. .................. 156/268; 156/270; 156/353; 156/387; 156/528; 83/209; 83/364; 83/370

[58] Field of Search .............. 156/64, 250, 257, 264, 156/267, 268, 269, 270, 353, 384, 387, 510, 517, 526, 528; 83/72, 209, 211, 241, 243, 360, 363, 364, 370, 246

[56] References Cited

U.S. PATENT DOCUMENTS

| | | | |
|---|---|---|---|
| 3,749,626 | 7/1973 | Buck | 156/353 X |
| 4,236,955 | 12/1980 | Prittie | 156/353 |
| 4,549,454 | 10/1985 | Yamashita | 156/510 X |
| 4,661,189 | 4/1987 | Voy et al. | 156/268 X |
| 4,840,696 | 6/1989 | Krasuski et al. | 156/353 |

Primary Examiner—William A. Powell
Attorney, Agent, or Firm—Robert Shaw

[57] ABSTRACT

A system (and method) for providing a label for deposit on a product from a composite that includes the label, as one of a plurality of labels, on a backing. A transporter moves the composite translationally and accurately in a direction, e.g., the X-direction herein. The system ascertains the exact X-direction location of a particular label on the composite to permit the transporting to be achieved accurately translationally. A two-dimensional cutter serves to cut the label from the composite while leaving the backing intact, the cutter being operable to effect cutting of the label in two dimensions, e.g., across or orthogonal to the direction of movement of the backing and parallel to the direction of movement of the backing. There is provided a mechanism to control cutting from the composite to permit variation in the length of the label in the parallel direction, thereby controlling the length of the label in the parallel direction, despite fixed dimensions of the cutter roller.

32 Claims, 7 Drawing Sheets

VARIABLE LENGTH DIE CUTTER AND METHOD OF CUTTING COMPOSITE LABEL

BACKGROUND OF THE INVENTION

The present invention relates to a novel apparatus for making die cut labels of any length using a fixed dimension die cutter.

Attention is called to earlier applications for letters patent of the present inventor: Ser. No. 328,286 filed Mar. 24, 1986 and Ser. No. 386,214 filed July 28, 1989.

SETTING OF THE INVENTION

A label is a strip of material attached to an object that is marked with information relevant to the object. In producing labels, there are two significant factors to be considered: one is the form of the label (which includes the material of the label itself as well as the format in which it is supplied), its dimensions, method of attachment and finally format; the second is the method of marking the label and the information contained in the marking.

The most common form of label is that of a flexible material such as paper or imprintable plastic film that is coated on one side with an adhesive backing material, the adhesive coating side being laminated onto a coating material such as paper that has itself been treated with a release coating. This technique protects the adhesive side of the label until it is to be used, provides an easy way to separate the label from its backing, and further provides the way to attach the label to the object to be labeled. The label stock of this nature is supplied as a continuous roll, a fan-fold stack or as individual sheets.

Labels to be useful must be cut to size. The label stock as supplied from a coating operation usually comes in the form of a large continuous roll. This roll is then subjected to a process known as conversion in which several steps take place. These steps include slitting and rewinding which results in a roll of continuous stock of reduced dimensions. In addition, further steps of die cutting and preprinting can be undertaken to produce labels whose size and possibly information content are predetermined. Other steps such as perforating, punching and folding may be taken to produce fan fold or cut sheet.

The slitting step defines only the label width. Precutting and preprinting define not only the label length but also some if not all of the label content. These two latter steps require foreknowledge of the end use of the label and or its content and implicity restrict the use of the label to some extent to the application for which it was predefined. This restriction is not necessarily bad. There are many applications where the label size and or content is readily predefined and the volumes are sufficiently large that significant economies can be realized by producing the end label as a part of the conversion process.

There are however a great many applications that require variable information that cannot be effectively known until the label is about to be used. Information such as serial number, lot number, assay content, date of manufacture, customer ID, etc., is often required on a label and is not available until needed.

The most effective way to meet this need is to have a general purpose label printer on site to produce labels on demand. Available printers of this nature offer considerable flexibility in terms of label format and label size. They can be used with either previously die cut or continuous stock.

Die cut stock restricts the label size in two dimensions but when used alone defines the label and does not require a further cutting step. Continuous stock restricts the label size in only one dimension but requires a cutting step after printing in order to produce an individual label. This cutting step may be done manually as with a pair of scissors or automatically as part of the printer Further, the cutting can be complete, i.e., both backing and label stock cut through, or partial, i.e., the label stock cut through but the backing material left intact. Complete cutting is suitable for tag stock but is usually unsatisfactory for adhesive backed labels because it is difficult to start to peel the label from the backing after it has been flush cut and because it causes a number of problems in attempting to apply labels automatically.

Another serious consideration is that of protecting the surface of the label after it has been printed. Paper stock labels print well but are readily abraded or torn and are not waterproof. Plastic stock labels are strong and have good abrasion resistance as well as water and other solvent repellence but the printed image often remains on the surface of the label and is subject to smearing. Either stock can be protected by overlaminating the printed surface with a clear adhesive backed plastic film or laminate. As a rule, the laminate cannot be applied until after the label has been printed.

The easiest way to laminate labels is with a continuous roll of laminate that is the same width as the label stock. There are methods of applying die cut laminate over die cut label stock but they are quite cumbersome.

If the label stock is continuous, laminating the labels wtill produces a continuous label which must then be cut to size. If the label stock is die cut, laminating the labels with a continuous film results in what is effectively a continuous label which must still be cut.

The most general solution is to incorporate a laminating station and a cutter in conjunction with a printer as part of a machine to produce labels.

The cutter may take several forms. Butt cutters make one straight cut across the width of the stock. The cut effectively separates the trailing edge of one label from the leading edge of the subsequent label. Several types of butt cutters are well known, e.g., a stationary knife cutter ("Cutting Device", U.S. Pat. No. 4,494,435) or a rotary synchronous cutter (application for letters patent Ser. No. 386,214, filed July 28, 1989) and are incorporated in printer laminators manufactured by Imtec, Inc., Bellows Falls, Vt.

In some applications, a die cut label is either necessary or desirable. Butt cut labels are rectangles with square corners. Die cut labels can have corner radii of whatever shape the die cut is to be. The label edges can be defined by curvilinear lines of arbitrary shape. The rounded corners or curvilinear edges can be designed to be aesthetically more pleasing, at least to some. In addition to aesthetic considerations, after a label has been applied, it is more difficult to start to peel a label with rounded corners than one with sharp corners; hence it is felt that labels with rounded corners are more secure.

A rotary cutter as referenced above can be fitted with a cutter roller that contains a die cut knife in place of the elongate blades. If such a cutter is operated synchronously with the label stock it will produce die cut labels of the same dimension as the die. Operation of a rotary die in this manner is well known and is used extensively in conversion applications.

The problem with a rotary die operated in this manner is that the die defines the label length, that is, its longitudinal length herein. A new die must be machined for every label size. This presents the compound problem of having to design and pay for a different cutter roller for each and every label length as well as requiring mechanical disassembly and reassembly of the cutter every time the label size is changed. Further, the diameter of the cutter roller must be changed, based on the label pitch (number of labels per unit distance of the label stock). There are physical limitations to the maximum and minimum diameters of the cutter roller. Further, when the diameter of the cutter roller is changed, the linear velocity changes proportionally. In order to keep the cutter surface speed equal to that of the label stock, the cutter rotational speed must be adjusted. In a conversion machine, this is normally done by standardizing on a number of diameters and having an appropriate number of drive gears. In a stand alone printer, the size and cost restrictions make this approach awkward if not infeasible.

OBJECTIVES OF THE INVENTION

Accordingly it is an objective of the present invention to provide a mechanism for producing a die cut label of any desired length using a single cutting station without requiring tooling changes.

It is a further objective of the invention to produce the die cut labels automatically based on the size of the label being printed or processed and to allow label lengths to be freely intermixed.

These and still further objectives are addressed hereinafter.

SUMMARY OF THE INVENTION

The foregoing objectives are achieved in apparatus that includes a transporter mechanism for moving a label stock, a detector for identifying the exact position of the label in the transporter, a rotary die cutter of known length that is separately operable, and a controller that monitors label position and controls the operation of the die cutter in such a way as to produce die cut labels of varying length.

DETAILED DESCRIPTION OF THE INVENTION

Figure 1:
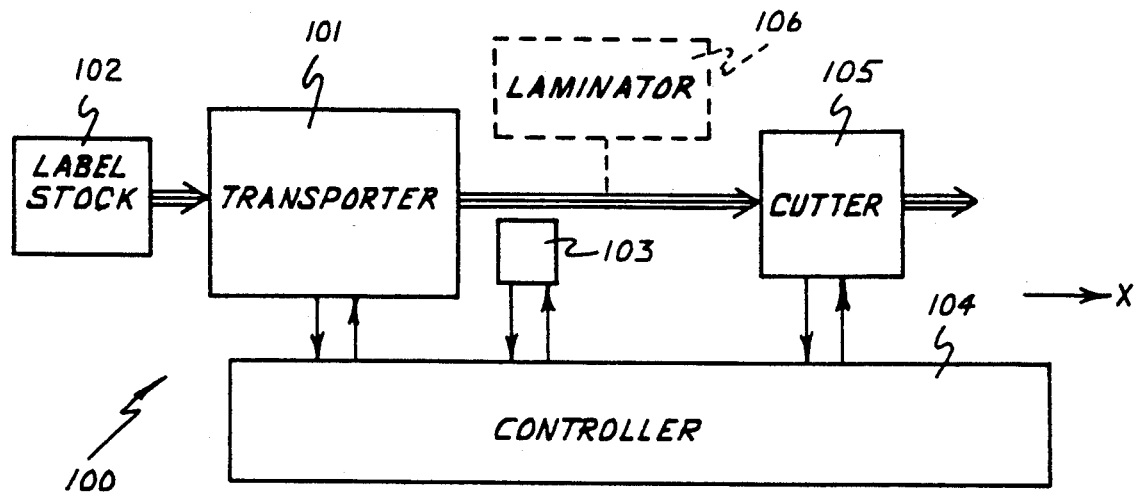
FIG. 1 is a block diagram showing the interrelationships amongst the various mechanisms that compose the present invention.

The block diagram labeled 100 in FIG. 1 depicts a variable length die cutting system showing the interrelationships amongst the various elements that together form or constitute the present invention. Included is a transport mechanism 101 arranged to move label stock 102 precisely in a direction (i.e., the longitudinal or length or X-direction herein). A detection mechanism 103 is arranged to determine the precise position of individual labels. A separately positioned controllable rotary die cutter 105 is arranged to make precise curvilinear—or other—cuts on the label stock. The transporter 101 and cutter 105 are interconnected with a controller 104 that operates the transporter 101 and cutter 105 in such a way as to advance the label stock through the transporter 101 and individually die cut the labels to the desired size. An optional laminator 106 is arranged to apply a laminating film over the label prior to cutting. (See the earlier Murphy patent applications.)

Figure 2:
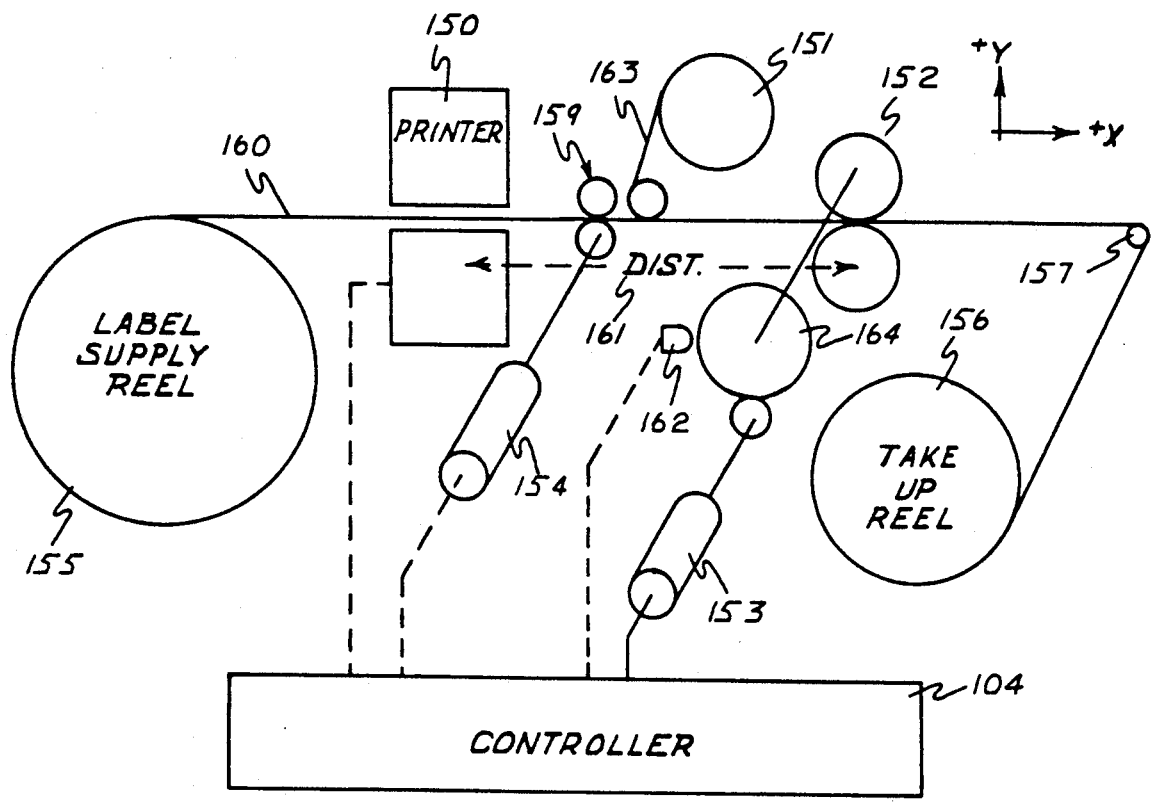
FIG. 2 is a schematic representation of a machine embodying the concepts of the invention.

FIG. 2 is a mechanical schematic of a preferred embodiment of the present invention. A transport mechanism consisting of a label supply reel 155, a capstan and pressure roller assembly 159, and a takeup reel 156 is arranged to transport label stock 160 under the control of a positionally controllable motor 154 past a printer station 150, an optional laminating station 151 and a rotary die cutter station 152. The die cutter station 152 is operated by a separate positionally controllable motor 153. Operation of the printer station 150, the capstan motor 154 and the die cutter motor 153 are all controlled individually by the controller 104.

In this embodiment the printer operating in conjunction with the capstan motor 154 constitutes the detector 103 of the block diagram of FIG. 1 in that labels are defined by the location of the printing on the label. The distance 161 between the print point and the cut point on the label stock, labeled DIST in FIG. 2 is a known constant for any given configuration. The controller 104 serves to position the label stock precisely in the label length (i.e.,X) direction by means of the capstan motor 154 and capstan assembly and to control the printer 150 in such a way as to place desired indicia on the surface of the label. The printer 150 may be any type of printer suited for the purpose such as impact drum, dot matrix, thermal transfer, etc. The controller 104 operates the cutter motor 153 in such a way as will be explained hereinafter to cut the label stock into die cut labels of any desired length. (Programming the controller 104 to perform the various functions herein required is well within the skill of workers in this art which is quite sophisticated in programming techniques.)

It will be recognized that alternative embodiments of the invention both with and without the printing station are possible. For example, the detector can be an optical detector suitable for sensing preprinted marks, gaps between die cut labels, holes punched in the stock, printed data, etc.

Figure 3:
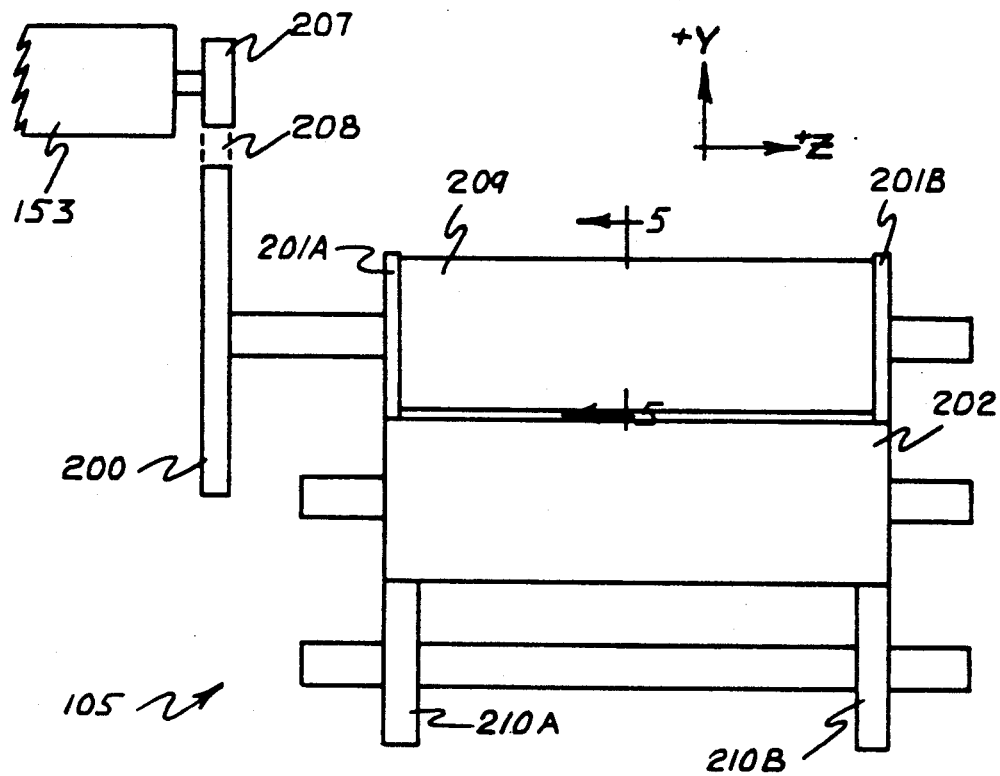
FIG. 3 is a view of a cutter assembly embodying the concepts of the present invention.

The rotary cutter station 152 is shown further in FIG. 3. The positionally controllable motor 153 drives a pulley 200 attached to the shaft of the cutter roller 209 through a pulley 207 and a timing belt 208. The cutter roller diameter, pulley drive ratio and position increment of the motor are chosen such that one position increment of the label stock through the positionally controllable motor 154 corresponds to an identical linear motion of the circumference of the cutter roller 209.

The two precision machined surfaces 201A, 201B of the cutter roller 209 bear against a master roller 202 which in turn bears against bearings 210A, 210B. The rollers and bearings are supported by additional bearings, shafts and a rigid housing which, for clarity, are not shown in the figure. The diameter of the cutter roller 209 is fixed at a reference dimension at the outside precision surfaces 201A, 201B. The diameter everywhere else along the cutter roller 209 length is undercut by an amount greater than the maximum stock thickness everywhere except in those areas where it is desired to cut the stock; the cutter roller 209 is machined in the shape of a knife edge, the outline of the knife edge being the length and width desired for the label to be cut and the point of the knife edge being machined to a radius that is below the radius of the surfaces 201A, 201B by an amount equal to the thickness of the backing of the label stock. These knife edges are shown as 203, 204, 205 and 206 in the figures.

If label stock is placed between the cutter roller 209 and the master roller 202, such that the backing portion is adjacent to the master roller, and if, further, the label stock is moved in the positive X-direction as the cutter roller is rotated, and if, further, the cutter is rotated such that the linear velocity of the knife edges in the positive X-direction is exactly equal to that of the label stock, then the cutter will cut the label stock to a dimension equal to the outline of the knife edges. This is in fact the elementary method of operating such a cutter. In the elementary case, the cutter is mechanically connected to the label drive system through appropriate gearing to achieve this synchronism.

Figure 4:
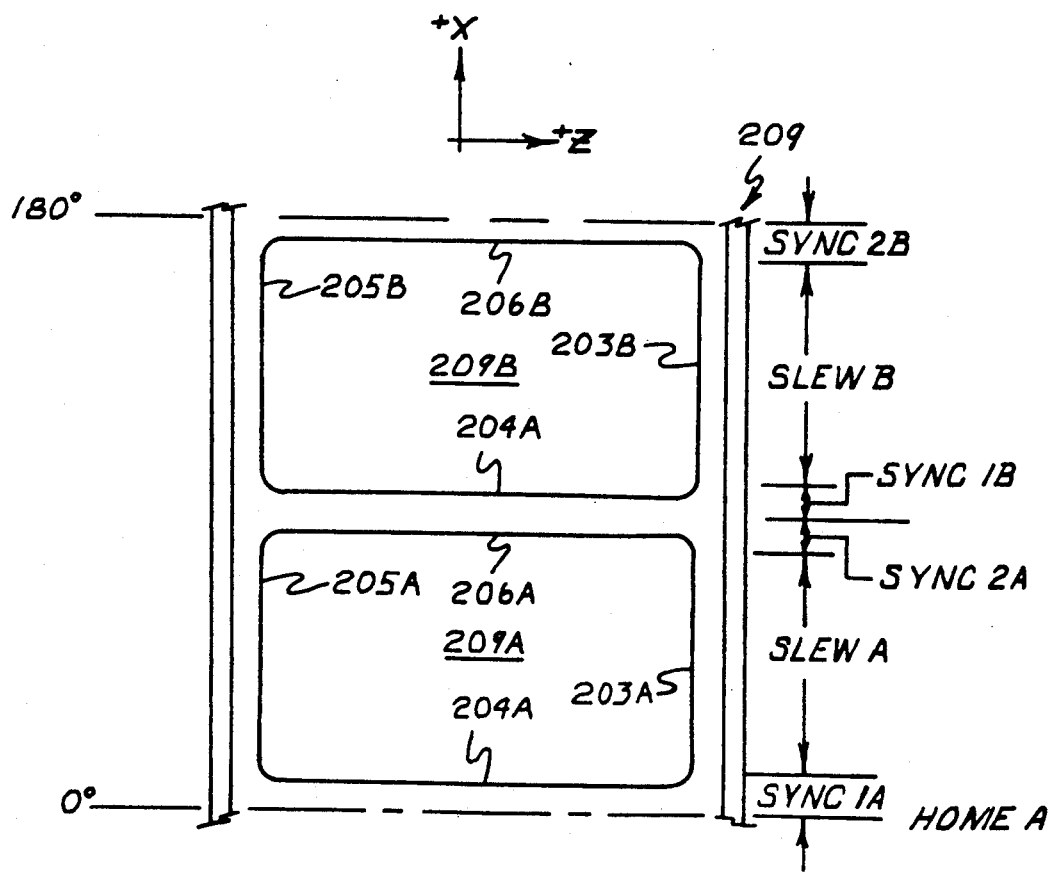
FIG. 4 is a plane projection of the circumferential surface of the die cutter assembly.

FIG. 4 is a plane projection, diagrammatic in form of part of the circumference of a cutter roller 209 as it rotates. Each knife set is indicated by a literal suffix A, B, etc. (i.e., 209A, 209B . . . ) A point midway between the trailing knife edge 206D, not shown, of one blade set and the leading edge 204A of the following set is marked HOMEA . . . . Each knife set 209B is then subdivided into three regions marked SYNC1, SLEW and SYNC2. A four-section die cutter is shown in the figure, but this use is illustrative rather than restrictive. In the concept of the present invention, there may be any number of knife sets 209A . . . arranged around the circumference of the cutter roller 209 as determined by the geometry of the roller and other considerations such as speed and wear. For completeness, the cutter roller 209 includes four cutters 209A . . . which have lateral cutters or blades 206A and 204A and parallel cutters 203A and 205A respectively to cut in the transverse or lateral direction and the parallel direction, respectively. The cutter roller 209 rotates about the Z-axis, as is explained elsewhere herein, and cuts labels from the backing as the two, as a composite, move in the X-direction.

As stated previously, if the cutter roller 209 is operated synchronously with respect to the label stock 102, the label stock will be cut to a shape that is identical to that of the die knives. To change the label length (i.e., the X-direction) then requires that a new die cutter be machined in the shape of the new label, and that the cutter roller diameter and motor gearing be adjusted so as to maintain linear motion synchronism with respect to the label stock. However, by using the concepts of the present invention, it is possible to obtain a label of varying length (in the X-direction) while using a fixed length die cutter.

Referring back to FIG. 4, the region marked SYNC1A declares SYNC1, etc., generally and is characterized as that region in which the knife edge 204A has a significant dimension in the Z-direction, that is, perpendicular to the direction of travel of the label stock). Similarly, the region marked SYNC2A is characterized as that region in which the trailing knife edge 206 (i.e., 206A . . . ) has a significant dimension in the Z-direction.

The other region marked SLEWA in FIG. 4 is characterized as that portion of the cutter where the knife edges 203A . . . 205A . . . are essentially parallel to the direction of travel (X-direction) of the label stock and hence have no significant component in the Z direction.

If the die cutter roller 209 is operating such that the stock is being cut in the regions labeled SYNC1A or SYNC2A, any relative motion of the die cutter roller 209 with respect to the label stock will result in forces on the label stock in the direction of travel of the label stock. These forces can affect operations up or downstream of the cutter roller 209, such as degrading print quality. They can also result in tearing of the label stock or peeling of the label from the liner. Therefore, whenever the die cutter is operating in a portion of the die that is characterized as having a significant cutting component of the knife blade in the Z-direction, the cutter roller 209 is operated synchronously with respect to the label stock.

When the die cutter roller 209 is operated in a region where the knife edges are essentially parallel to the direction of motion of the label stock, i.e., when the blades 203A, 205A are cutting the label stock, shown for example as that marked SLEWA in FIG. 4, the effect of relative motion of the cutter roller 209 with respect to the label stock depends upon the direction of relative motion. If the cutter roller is turning faster than the label stock, then the knife blade simply slips through the already cut portion of the label stock. If the label stock is moving faster than the knife edge, then the label stock slides past the knife edge. In essence, the cutter roller 209 acts as a slitter when operating in this mode. The forces on the label stock in the X-direction are quite low under these conditions and will not affect operations upstream or downstream.

Figure 5A:
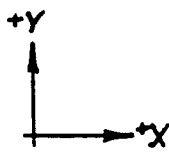
FIGS. 5A-5G are cross sectional views of the die cutter portion of the cutter assembly of FIG. 3 (section lines omitted), taken along the line 5—5 in FIG. 3, looking in the direction of the arrows and depicting several angular positions of the die cutter for various control states of the controller.
Figure 5A:
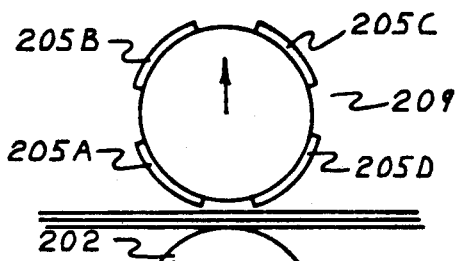

In the embodiment of the invention shown in FIG. 2, a sensor 162 is arranged to determine the home position of the cutter roller 105. This corresponds to the position marked HOME in FIG. 4. FIGS. 5A . . . show several positions of the cutter roller as it progresses through a cut cycle. FIG. 5A corresponds to the home position and is characterized as being that location midway between the trailing edge 206 of one knife set and the leading edge 204 of the following knife set. Normally the die cutter knives are laid out such the neither of the knife edges 204, 206 is in contact with the stock when the cutter roller 209 is in this position. This is done so that the stock can be threaded through the machine with the cutter in its home position and so that the stock can be driven through the machine with the cutter roller 209 at rest and with no cutting action taking place.

Figure 5B:
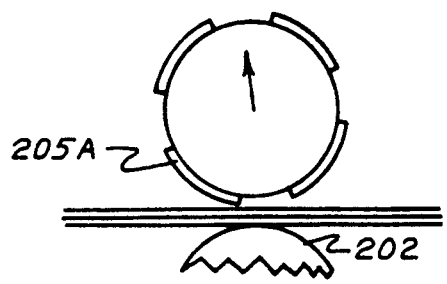
Figure 5C:
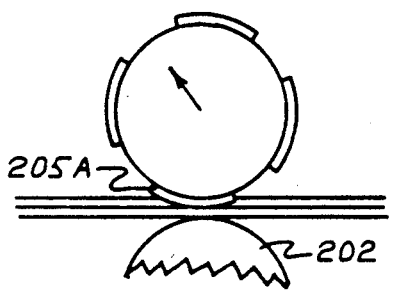
Figure 5D:
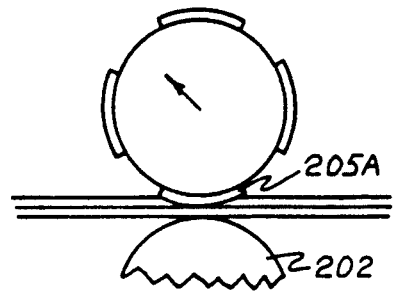
Figure 5E:
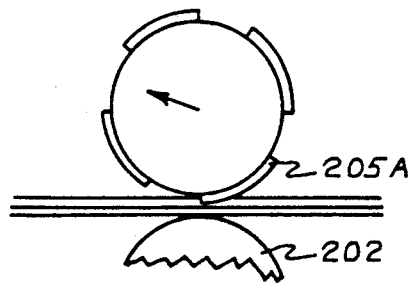
Figure 5F:
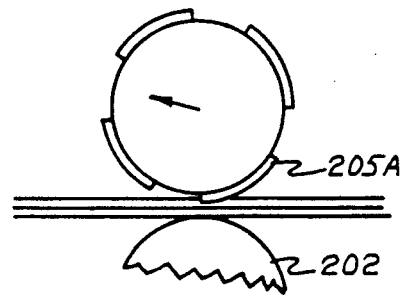
Figure 5G:
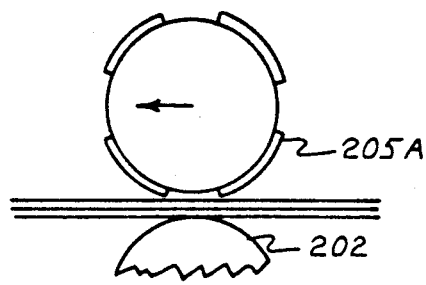

The controller 104 of FIG. 2 is preprogrammed with the fixed distance 161 from the print point to the cut point on the label stock. As the controller 104 advances the label stock through the mechanism, it keeps track of the location of the printed label edges. When the leading edge of the first label gets sufficiently close to the cut point, the controller operates the cutter motor 153 in position synchronism with respect to the motion of the label, thereby causing the cutter roller 209 to rotate. As the cutter roller 209 rotates, the leading knife edge 204 contacts the label stock and begins to cut it. FIGS. 5B–5D show the knife edge 204 as it contacts, completely cuts and finally comes clear of the label stock. This portion of the rotational sequence is designated as SYNC1A in FIG. 4. The velocity of the label stock need not be and, in fact, normally is not constant at this or any other time in the cycle. It is the relative velocity or positional difference between the cutter knife and the label stock that must be maintained at zero.

Once the leading knife edge 204A ... comes free of the stock, the cutter roller 209 can now be operated independently of the label stock since relative motion of the cutter with respect to the label stock has no effect on the stock except to slit it to a fixed width as determined by the spacing of the blades 203, 205. Since the controller determines the label length either by direct measurement, control of the printing process or from preprogramming, it can control the cutter roller 209 while the cutter roller 209 is in the SLEW portion of its cycle to obtain a variable length label.

Figure 6A:
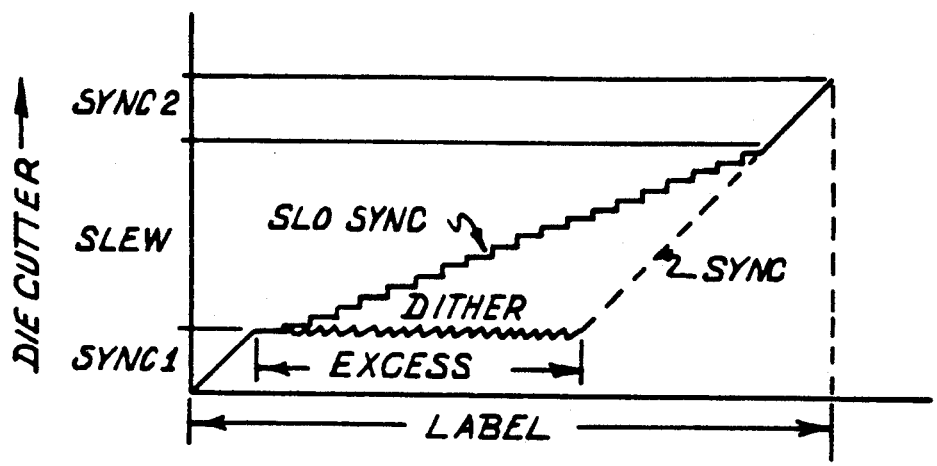
FIGS. 6A-6C are diagrams showing the positional relationship of the die cutter with respect to the label stock for the three conditions of label length with respect to die cutter length.
Figure 6B:
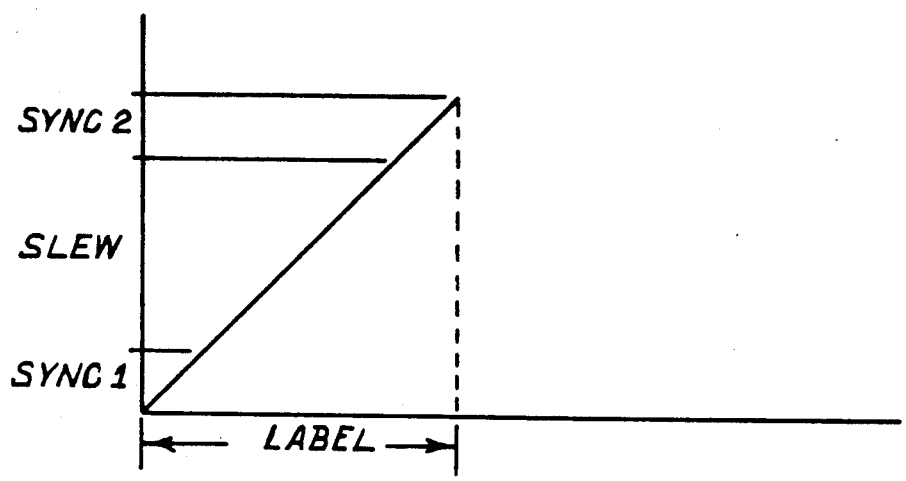

Referring to FIG. 6B, the controller 104 is preprogrammed with the exact length of label that would be cut by the die cutter roller if the roller were to be operated synchronously throughout a cycle. This length is shown as the length DIECUTTER in FIG. 6. Further, the length DIECUTTER is equal to the sum of the lengths SYNC1, SLEW and SYNC2 of FIG. 4. These three dimensions are also known to the controller 104. Once the controller 104 determines that the cutter has advanced past the portion of the cut cycle designated SYNC1, it calculates the difference between the label length (LABEL) and the diecutter length DIECUTTER.

If this difference is zero, then the label is the same size as the die cutter and the controller 104 will continue to operate the die cutter 105 synchronously with respect to the label stock throughout the remainder of the cut cycle. This is the condition shown in FIG. 6B, in which the horizontal axis represents motion of the label stock and the vertical axis motion of the cutter roller. For the zero difference condition, there is one for one correspondence between motion of the stock and motion of the cutter.

If the label length is greater than that of the cutter, then the controller 104 causes the cutter roller 209 to effectively slow down during the portion of the cut cycle marked as SLEW in FIG. 4. This is referred to as the slide mode, in that the stock slides past the cutter blades 203, 205. There are several control strategies for achieving this slowdown. The controller 104 can calculate the difference shown in FIG. 6A as EXCESS. It can then allow an amount of stock equal to EXCESS to pass through the machine before it resumes synchronous operation. In practice, the controller 104 would normally oscillate the cutter back and forth a small amount (dither) as the label stock passed through the machine in order to reduce friction between the cutter roller 209 and the thing cut, i.e., the label 310. Operation in this mode is illustrated in FIG. 6A as the region marked DITHER. Alternatively, the controller 104 can calculate the ratio R between the length of the label minus the distances SYCNC1 and SYNC2 divided by the distance SLEW. It can then use this ratio R to advance the cutter one position increment for every R position increments of the label stock. Operation in this mode is illustrated in FIG. 6A as the region marked SLOSYNC. During SLOSYNC, the cutter roller 209 can be held stationary for the R-1 steps of the label stock, or it can be dithered to reduce friction. When the length of label stock remaining to pass through the cutter is equal to the length remaining for the cutter to travel to home, the controller 104 will resume synchronous operation. The positional correspondence between the die cutter roller 209 and the label stock for either of these strategies is shown in FIG. 6A. If the label length is greater than the distance between the print point and the cut point 161 in the FIG. 2, the controller 104 may not know the label length at that instant. This could well be the case if preprinted sense marks were being used on the label stock and they were spaced further apart than the distance 161. Under these conditions, the controller 104 can simply set the cutter roller 209 up to dither continuously until it finally does determine the label length, whereupon it can revert to either of the above strategies. There is no inherent limit in the length of the label that can be produced from a given die cutter using this strategy other than the amount of stock on the supply reel. The effect, then, is one of generating a label of any arbitrary length greater than the die cutter length using a fixed length die cutter (i.e., a cutter that typically in the form of a polygon with two substanially parallel transverse knives and two substanially parallel parallel knives) . These and other control strategies are possible and all are deemed to fall within the scope of the present invention.

Figure 6C:
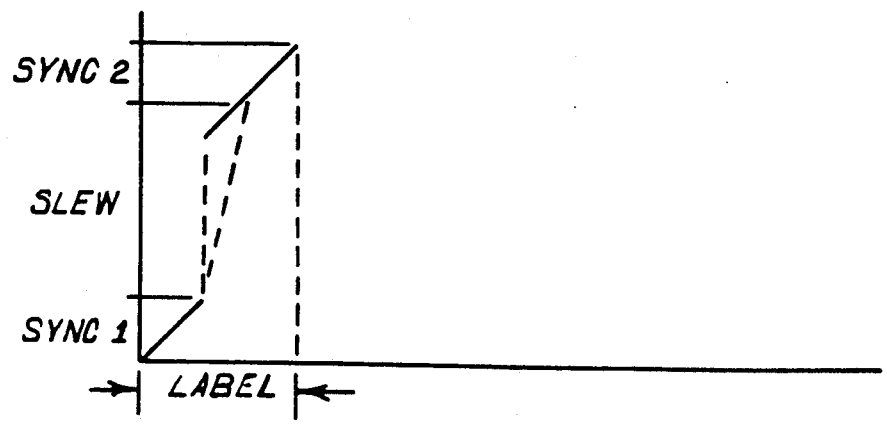
Figure 7:
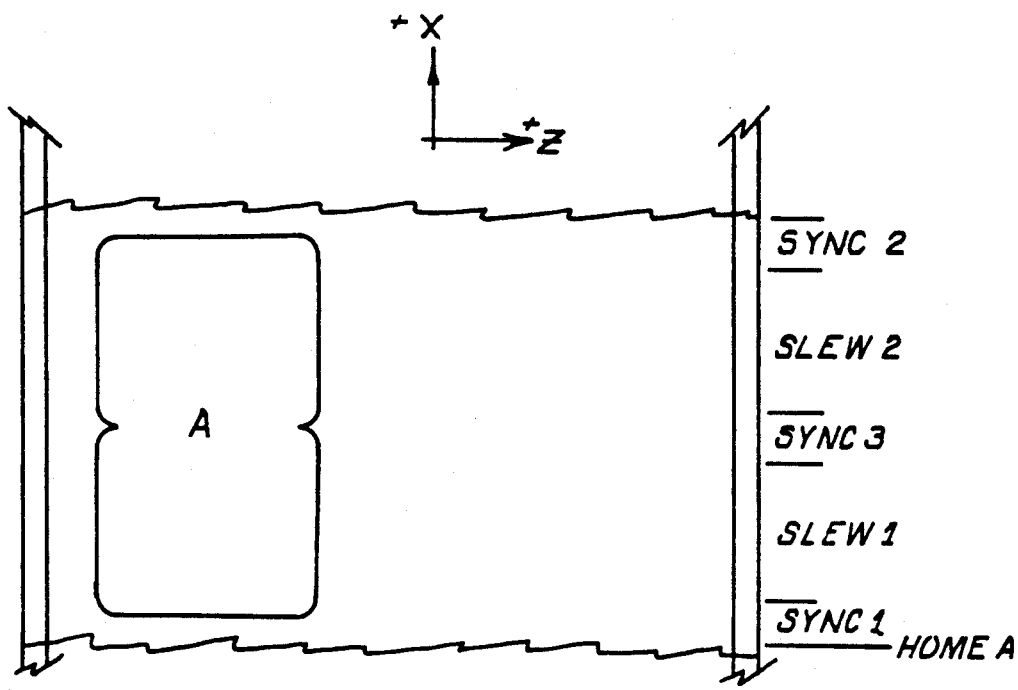
FIG. 7 is a plane projection of the circumferential surface of a die cutter containing multiple curvilinear sections separated by parallel cutter sections.

A third possible condition is the case where the label length is shorter than the die cutter. Under this condition, the controller operates the cutter in what is referred to as the slip mode. The controller 104 determines the difference between the label length minus (SYNC1 plus SYNC2) and the SLEW distance of the die cutter. It then advances the die cutter roller 209 at high speed until it makes up this offset, taking into account any motion of the label stock as it progresses. The effect is to cause the die cutter knives 203, 205 (i.e., the knives parallel to the longitudinal or length direction) to slip through the stock until the cutter has come to a synchronous position. The positional relationships between the die cutter roller 209 and the label stock are shown in FIG. 6C. Two possible paths are shown, one that has no motion of the label stock during the time that the cutter roller 209 makes up the offset (STATIONARY) and the other in which the stock moves while the cutter is making up the offset (MOTION). The cutter roller 209 then reverts to synchronous operation once the offset has been made up.

The controller 104 always monitors the cutter roller 209 position to be sure that it will never be operated in SLIP or SLIDE mode except when it is in the SLEW portion of its cut cycle. This implies that the smallest label that can be die cut with this system is one that is SYNC1 plus SYNC2 units long. In practice, it must be slightly longer than this if motion of the label stock during SLIP mode is permitted.

The control conditions described above are such that the cutter roller 209 has always gone back to the synchronous mode of operation by the time that the SYNC2 portion of the cutter is cutting the label stock. This condition is necessary to fulfill the requirements that there be no relative motion of the cutter roller 209 with respect to the stock during either of the SYNC portions of the cutter cycle.

Under the concept of the present invention, the distance SLEW may be broken up into two or more distances SLEW1, SLEW2, etc., separated by other distances SYNC3, etc., where the SYNCX distances have portions of the die knives that contain significant components in the Z direction and the SLEWX portions have no such Z direction components. The controller 104 need only know the relevant dimensions of the die cutter roller 209 and the corresponding label to carry out the same control strategies as disclosed above in generating labels of different sizes while using a fixed length die cutter, and all such modifications are deemed to fall within the scope of the present invention. Further, the cutter roller 209 may have mutiple die knife sets 209A, 209B, etc., as shown in FIG. 4, for example. These knife sets need not be identical and in fact can be substantially different as long as the controller 104 is preprogrammed with the knife set dimensions and the detector 162 can provide adequate position information of the cutter roller 209. In addition, multiple knife sets can be arranged in the axial or direction and they too fall within the scope of the present invention.

Figure 8:
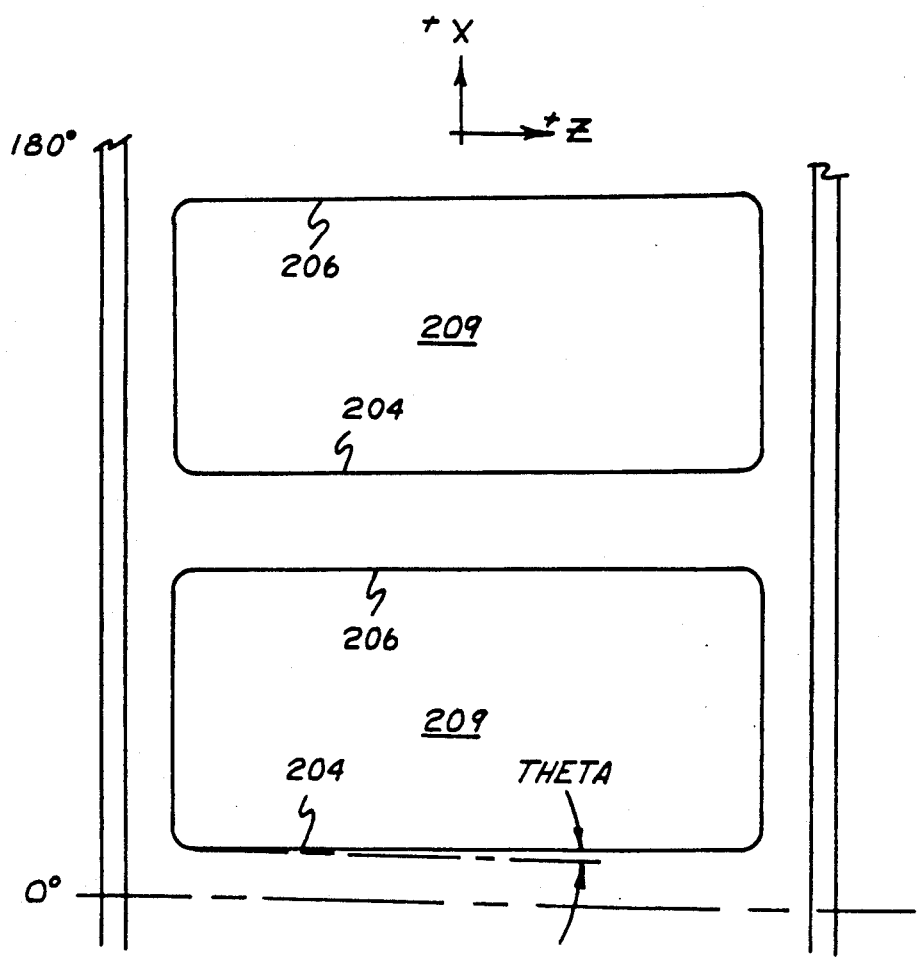
FIG. 8 is a plane projection of the circumferential surface of an alternate form of a die cutter in which the portion of the blades that are oriented principally parallel to the major axis of the cutter cylinder are skewed with respect to that axis by a small helical theta.
Figure 9:
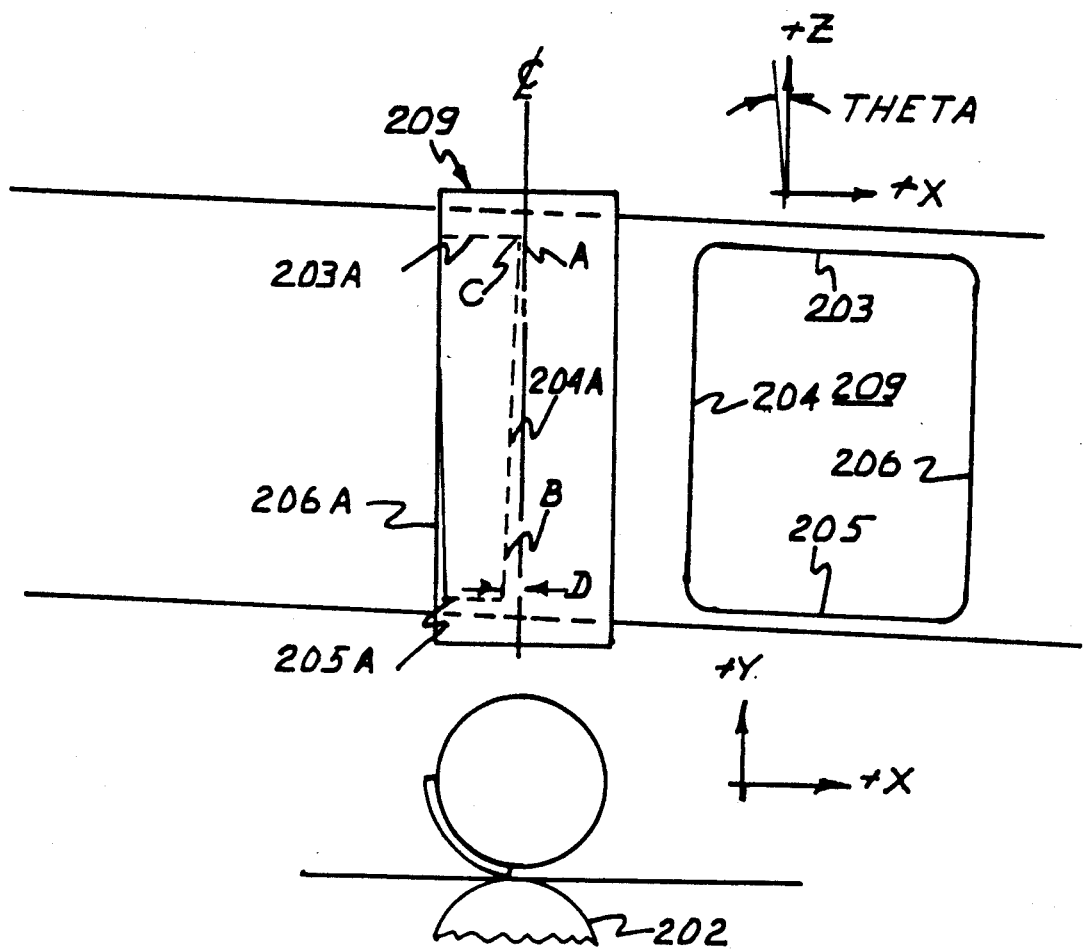
FIG. 9 is a top view of a cutter assembly containing the cutter of FIG. 8.

In the application for letters patent Ser. No. 386,214 filed July 28, 1989, considerable discussion is devoted to the peak forces required to cut a wide label with a knife edge. When a die cutter is used, the same situation applies if the leading and trailing edges of the die are of significant length and are perpendicular to the direction of travel of motion of the label stock (i.e., coincident with the Z axis of FIG. 3). To keep the costs and structural size of a die cutter suited to a stand alone application, the blades are modified somewhat. Reference is made to FIG. 8 which is a plane projection of an alternative die layout to that shown in FIG. 4. The knife blades 204', 206' of a cutter roller 209', are skewed by a small helical angle THETA with respect to the Z axis. The reason for doing this is to spread the actual cut out over a wide angle of rotation of the cutter. In essence, the cut starts at one edge of the label and progresses in the Z direction while the cutter rotates and the label stock moves in the X direction as described in the cited reference. The skewing of the leading and trailing edges of the label that would otherwise occur because of the helical angle is compensated by offsetting the entire cutter assembly an equal and opposite angular amount as shown in FIG. 9. This effectively restores the leading and trailing edges of the label itself to being perpendicular to the direction of travel of the label stock (X axis) while reducing the peak cutting forces significantly.

It can be seen from FIG. 9 that offsetting the cutter assembly by the small angle THETA results in the blades 203' (or 203A), 205' (or 205A) that are normally parallel to the X (label stock travel) direction becoming angularly offset with respect to the X direction by the same angle THETA. This effect does not present a problem for two reasons. First, the angular component of the cutting force or displacement in the Z direction is given by the sine of the offset angle THETA and this component is small enough to be neglected. Second, either cutter knife cuts only at one point relative to the label stock or the cutter assembly as shown in FIG. 9, and even though the locus of points for a cutter knife such as 205' around the circumference of the cutter roller as described by the rotation of the cutter is skewed by the angle THETA with respect to the locus of points connecting the desired cut segment on the label, the effect is as though the cut point were stationary with respect to the Z axis but moving along the label stock in a line parallel with respect to the X-axis.

Figure 10A:
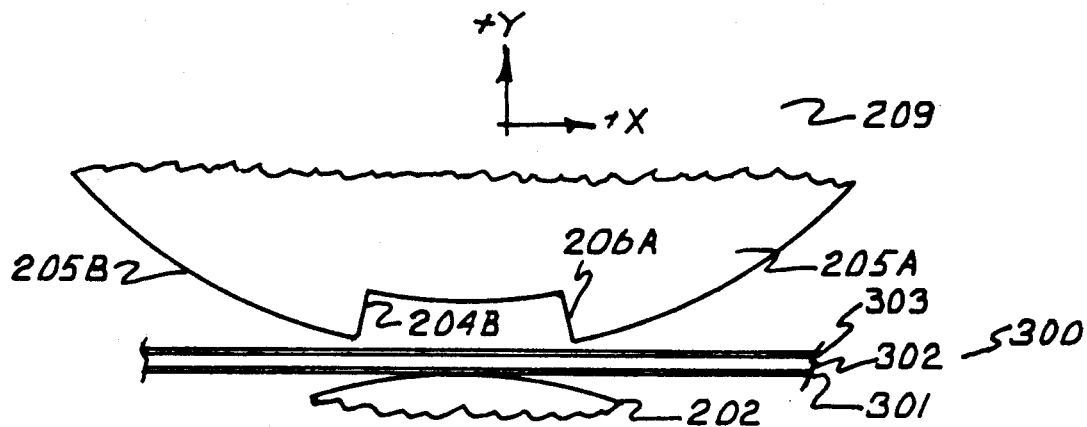
FIGS. 10A and 10B show a cutter and cut stock, respectively.
Figure 10B:
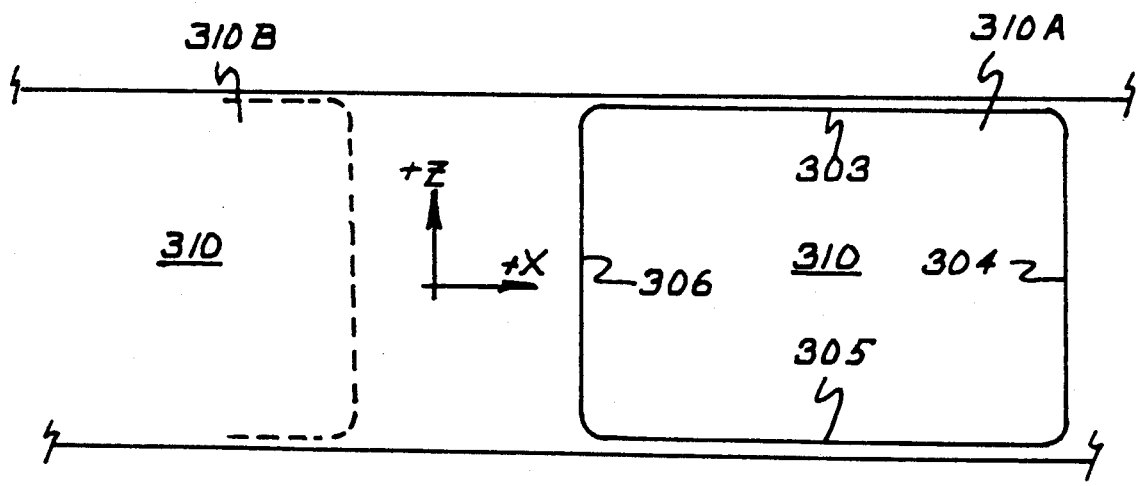

A brief re-capitulation with reference to FIGS. 10A and 10B will be useful. There is disclosed a die cutter mechanism for cutting labels 310 (i.e., 310A, 310B, etc.) from a backing 301. The die system 100 of FIG. 1 includes a transporting mechanism 101 to receive a composite 300 in FIG. 10 that includes a plurality of labels 310A . . . on a backing 301 and adapted to transport the composite 300 in a longitudinal direction, that is, the X-direction herein. A detector 103 is operable to ascertain the exact location of individual labels 310A . . . , as well as, to provide signals to permit the transporting to be achieved with measured precision in the longitudinal direction. A fixed dimension, two-dimensional rotary cutter 209 is positioned and is operable to cut a label 310 from the composite 300 in a rotational mode as the composite is being transported in the longitudinal or X-direction without cutting the backing 301 of the composite 300. A drive mechanism and controller 104 serves to drive the rotary cutter 209 in rotary motion to effect cutting of the leading edge 304 of the label in FIG. 10 in a transverse direction orthogonal to the longitudinal X-direction and then at two sides 303,305 of the label parallel to the longitudinal, i.e., X-direction, as the composite 300 moves along, the drive mechanism 153, 164, 152 of FIG. 2 and controller 104 being adapted to stop—or to increase or decrease (SLIP or SLIDE, respectively)—rotary motion of the cutter roller 209 as the composite 300 moves along and while cutting of the sides 303,305 continues to cut the sides to lengths that are not limited by the dimensions of the cutter edges 303, 305 effecting cutting of the sides and being adapted, as well, to continue rotation of the rotary cutter 209 which then effects cutting of the trailing edge 306 of the label 310 whereby the lengths of the sides 303, 305 of the label 310 are precisely controllable in length.

In the die cutter mechanism 105, the drive mechanism is typically a stepper motor or a servomotor with its control. Typically the mechanism 101 includes a detector that serves to provide precise position information with respect to position in the longitudinal direction of individual labels. The detector may take various forms, as discussed earlier herein and in the art of record.

Modifications of the invention herein disclosed will occur to persons skilled in the art and all such modifications are deemed to be within the scope of the invention as defined by the appended claims.

What is claimed is:

1. A cutter operable to cut a composite-strip label in two dimensions with or without cutting the backing, that comprises:
   a transporter mechanism to receive said composite label and accurately operable to move the composite translationally in a direction that is parallel to the longitudinal dimension of the strip;
   detection means suitable to ascertain the exact location of individual labels on the composite-strip label and interconnected to provide signals to the transporter mechanism to enable the transporter mechanism to move the composite precisely along said direction;

a cutter and actuator assembly, comprising a cutter mechanism capable of cutting in two axes, said cutter and actuator assembly being interconnected with the transporter mechanism; and control means to effect accurate cuts of labels while the transporter mechanism is moving the composite, such cuts including precision linear or curvilinear cuts;

said cutter and actuator assembly being further operable to make cuts at said edges parallel to said direction and of varying length;

said cutter and actuator assembly being further operable to terminate cutting.

2. Cutter apparatus according to claim 1 wherein the cutter mechanism comprises a cylinder with at least one compound blade consisting of at least two elongate curvilinear blades at the cylinder periphery oriented generally axially with respect to the cylinder, said blades being interconnected with at least two elongate blades at the cylinder periphery oriented on a plane that is perpendicular to the cylinder axis.

3. Cutter apparatus according to claim 1 wherein the cutter mechanism comprises a cylinder with at least one compound blade consisting of at least two elongate curvilinear blades at the cylinder periphery oriented axially with respect to the cylinder, said blades being interconnected with at least two elongate blades at the cylinder periphery oriented on a plane that is perpendicular to the cylinder axis.

4. Cutter apparatus according to claim 1 wherein the cutter mechanism comprises a cylinder with at least one compound blade consisting of at least two elongate curvilinear blades at the cylinder periphery oriented to have a major axial component with respect to the cylinder, said blades being interconnected with at least two elongate blades at the cylinder periphery oriented on a plane that is perpendicular to the cylinder axis.

5. Cutter apparatus according to claim 1 wherein the cutter mechanism comprises a cylinder with at least one compound blade comprising at least two elongate curvilinear blades at the cylinder periphery oriented to describe a helical path with respect to the cylinder, said blades being interconnected with at least two elongate blades at the cylinder periphery oriented on a plane that is perpendicular to the cylinder axis.

6. Cutter apparatus according to claim 1 in which said helical angle is between one and four degrees per inch of axial cylinder displacement.

7. Cutter apparatus according to claim 5 in which the small helical angle is about one and one half degrees per inch of axial displacement.

8. Cutter apparatus according to claim 5 in which the cutter axis is disposed at a slight angle to a line perpendicular to said direction.

9. Cutter apparatus according to claim 8 in which the slight angle is equal and opposite to the small helical angle in order to effect a cut across the composite label by the curvilinear elongate blades that is oriented generally parallel to a line perpendicular to the said direction.

10. Cutter apparatus according to claim 9 that has a plurality of composite blades spaced around the periphery of the cylinder and disposed in the manner of said composite blade.

11. Cutter apparatus according to claim 10 in which the each of the plurality of composite blades is identical.

12. Cutter apparatus according to claim 10 in which some or all of the plurality of composite blades are dissimilar.

13. A machine that includes the cutter apparatus according to claim 1 and that further includes a printer to apply indicia onto the label and wherein said printer may constitute the detection means.

14. A machine that includes the cutter apparatus according to claim 1 and that further includes means for applying a protective laminate film over the label stock prior to cutting.

15. A machine according to claim 13 that further includes a means for applying a protective film over the label after printing but prior to cutting.

16. A machine that includes the cutter apparatus of claim 9 and wherein the detection means is responsive to preprinted information or sense marks or prepunched holes that serve to demarcate labels.

17. A machine according to claim 16 that includes a means of applying a protective film over the label prior to cutting.

18. A machine according to claim 17 that includes a printer for applying indicia to the label prior to cutting.

19. A machine according to claim 17 that includes a printer for applying indicia to the label prior to laminating and prior to cutting.

20. A machine that includes the cutter apparatus of claim 9 and wherein the detection means is responsive to gaps between individual labels of precut stock disposed on said backing.

21. A machine according to claim 20 that includes a printer for applying indicia to the label.

22. A machine according to claim 20 that includes a means of laminating a protective film to the surface of the label prior to cutting.

23. A machine according to claim 22 that includes a printer for applying indicia to the label, said printer being disposed before the laminating station.

24. A system that includes the cutter apparatus of claim 1 and that further includes mechanisms to perform at least one of flood coating, winding, slitting, preprinting, adhesive coating, and laminating.

25. Cutter apparatus according to claim 9 in which the elongate blades located on the plane perpendicular to the cylinder axis are further demarcated into blades that are located on said plane interconnected with curvilinear blades.

26. A method of cutting a composite label in two dimensions with or without cutting the backing of the composite label on which is disposed a plurality of labels, that comprises:

transporting the composite accurately translationally in a direction;

ascertaining the exact location of individual labels on the composite and providing signals to permit the transporting to be achieved accurately translationally in said direction;

providing a cutter and actuator assembly comprising a two-dimensional cutter of fixed dimensions capable of cutting in two axes, the cutter and actuator assembly being interconnected to provide signals to enable the transporting accurately translationally;

effecting accurate cuts of labels in said direction while moving the composite in the said direction, said accurate cuts being variable in length in said direction; and controlling said length of the variable cut in the said direction.

27. A method of providing a label from a composite that includes the label as one of a plurality of labels and a backing, that comprise:

transporting the composite accurately and translationally in a direction;

ascertaining the exact location of individual labels on the composite in said direction and providing signals to permit the transporting to be achieved accurately translationally in the said direction;

providing a fixed-dimension, two-dimensional cutter that is operable to cut the label from the backing of the composite while leaving the backing intact; and interrupting or suspending cutting of the label by the two-dimensional cutter from the composite orthogonal to said direction to provide a controllably-variable length of label in said direction.

28. A method of providing a label from a composite that includes the label, as one of a plurality of labels, on a backing, that comprises:

transporting the composite translationally and accurately in a direction;

ascertaining the exact location in said direction of a particular label on the composite to permit the transporting to be achieved accurately and ascertainably translationally in said direction;

providing a fixed-dimension two-dimensional cutter that is operable to cut the label in two dimensions from the composite while leaving the backing substantially intact;

controllably prolonging cutting from the composite of the label parallel to said direction by the two-dimensional cutter while simultaneously suspending cuttng across the label orthogonal to said direction to permit variation in the length of the label in the parallel direction, thereby to permit control of the length of the label in the parallel direction.

29. A method according to claim 28 that includes dithering the cutter, that is, oscillating the cutter angularly back and forth a small amount to reduce friction while the stock passes through the cutter during the time of the step of controllably prolonging cutting from the composite to reduce friction between the cutter and the thing cut, that is, the label.

30. A die cutter mechanism for cutting labels from a backing, that comprises:

a transporter mechanism to receive a composite that includes a plurality of labels on a backing and adapted to transport the composite in a longitudinal direction;

a detector operable to ascertain the exact location of individual labels on the composite in said longitudinal direction and operable, as well, to provide signals to permit the transport to be achieved with measured precision in said longitudinal direction;

a rotary cutter having a fixed-dimension, two-dimensional rotary cutter that is positioned and is operable to cut a label from the composite in a rotational mode as the composite is being transported in said longitudinal direction without cutting the backing; and a drive mechanism and controller to drive the cutter roller in rotary motion to effect cutting of the leading edge of the label in a transverse direction orthogonal to said longitudinal direction and then at two sides of the label parallel to said longitudinal direction as the composite moves along, the drive mechanism and controller being adapted either to increase or decrease rotary motion of the cutter roller as the composite moves along and, while cutting of said sides continues, to cut the sides to lengths that are not limited by length dimensions of the knife edges of the cutter roller and being adapted, as well, to continue rotation of the cutter roller which then effects cutting of the trailing edge of the label, whereby the lengths of the sides of the label are precisely controllable in length despite the fixed dimensions of the cutter roller.

31. A die cutter mechanism as in claim 29 in which the drive mechanism and controller is a stepper motor with its control.

32. A die cutter mechanism as in claim 29 which includes detector means that serves to provide position information with respect to position in the longitudinal direction of individual labels.

* * * * *